(12) United States Patent
Spieth

(10) Patent No.: US 11,802,544 B2
(45) Date of Patent: Oct. 31, 2023

(54) ROTOR BLADE FOR A WIND TURBINE, ROTOR BLADE SEGMENT, WIND TURBINE, AND METHOD FOR PRODUCING A ROTOR BLADE

(71) Applicant: Wobben Properties GmbH, Aurich (DE)

(72) Inventor: Falk Spieth, Aurich (DE)

(73) Assignee: Wobben Properties GmbH, Aurich (DE)

( * ) Notice: Subject to any disclaimer, the term of this patent is extended or adjusted under 35 U.S.C. 154(b) by 141 days.

(21) Appl. No.: 17/624,807

(22) PCT Filed: Jun. 12, 2020

(86) PCT No.: PCT/EP2020/066345
§ 371 (c)(1),
(2) Date: Jan. 4, 2022

(87) PCT Pub. No.: WO2021/004723
PCT Pub. Date: Jan. 14, 2021

(65) Prior Publication Data
US 2022/0260049 A1 Aug. 18, 2022

(30) Foreign Application Priority Data
Jul. 5, 2019 (DE) ..................... 10 2019 118 317.0

(51) Int. Cl.
F03D 1/06 (2006.01)
F03D 13/10 (2016.01)
(52) U.S. Cl.
CPC ...... *F03D 1/0675* (2013.01); *F05B 2240/302* (2013.01); *F05B 2280/6003* (2013.01)

(58) Field of Classification Search
CPC ........ F03D 1/0675; F03D 13/10; F03D 13/20; F03D 80/00; F03D 1/04; F03D 1/0633;
(Continued)

(56) References Cited

U.S. PATENT DOCUMENTS 8,348,622 B2 1/2013 Bech
8,789,275 B2 * 7/2014 Esaki .................... F03D 1/0675
29/889.7
(Continued)

FOREIGN PATENT DOCUMENTS

EP 3 144 526 A1 3/2017
WO 03/078833 A1 9/2003

*Primary Examiner* — Audrey B. Walter
*Assistant Examiner* — Dapinder Singh
(74) *Attorney, Agent, or Firm* — SEED INTELLECTUAL PROPERTY LAW GROUP LLP

(57) ABSTRACT

A rotor blade for a wind power installation with a longitudinal direction in which the rotor blade extends, at least one first rotor blade segment with a first end face, and at least one second rotor blade segment with a second end face, wherein the first rotor blade segment is coupled on the end face in the longitudinal direction to the second rotor blade segment, wherein the first and second rotor blade segments each comprise: a blade laminate with a plurality of laminate layers which are arranged stacked in a profile thickness direction, and arranged on the end face, a plurality of mounting elements for coupling the first rotor blade segment to the second rotor blade segment, wherein each of the mounting elements extends in the longitudinal direction and has two contact faces which are arranged transversely, in particular orthogonally to the longitudinal direction at a distance from one another which diminishes in non-linear fashion towards the end.

20 Claims, 14 Drawing Sheets

(58) Field of Classification Search
CPC ............... F03D 9/257; F05B 2240/302; F05B 2240/30; F05B 2240/301; F05B 2240/303; F05B 2240/304; F05B 2240/307; F05B 2280/6003; F05B 2230/61; F05B 2230/60; Y02E 10/72; Y02E 10/728; Y02E 10/727; Y02E 10/74

See application file for complete search history.

(56) References Cited

U.S. PATENT DOCUMENTS

| | | | |
|---|---|---|---|
| 10,330,074 B2 * | 6/2019 | Jorgensen | ............... B29C 70/08 |
| 11,486,352 B2 * | 11/2022 | Merzhaeuser | ...... B29C 66/1286 |
| 2008/0069699 A1 | 3/2008 | Bech | |
| 2011/0158788 A1 | 6/2011 | Bech et al. | |
| 2012/0308396 A1 | 12/2012 | Hibbard | |
| 2016/0341177 A1 | 11/2016 | Bech et al. | |
| 2017/0089324 A1 | 3/2017 | Sanz Pascual | |
| 2018/0298879 A1 | 10/2018 | Johnson et al. | |
| 2018/0333922 A1 * | 11/2018 | Le Meur | ............... B29C 66/112 |

* cited by examiner

ROTOR BLADE FOR A WIND TURBINE, ROTOR BLADE SEGMENT, WIND TURBINE, AND METHOD FOR PRODUCING A ROTOR BLADE

BACKGROUND

Technical Field

The invention concerns a rotor blade for a wind power installation, a rotor blade segment for a rotor blade, a wind power installation, and a method for manufacturing a rotor blade.

Description of the Related Art

Wind power installations of the type cited initially are known. The most common type of a wind power installation at present is a so-called horizontal axis wind power installation which is usually equipped with three rotor blades, wherein wind power installations with one, two, four or more rotor blades are also possible.

As well as a rotor arranged on a nacelle, wind power installations usually comprise a tower on which the nacelle with the rotor is arranged so as to be rotatable about an axis oriented substantially vertically. As well as at least one of the rotor blades cited initially, the rotor comprises a hub on which the at least one rotor blade is arranged. Thus both a static load from the own weight of the rotor blades and also centrifugal forces occurring during rotation act on the rotor blades.

Wind power installations are becoming increasingly larger, in order firstly to be able to achieve a higher rated output and secondly to allow better utilization of the wind. As a result of the ever larger designs, the rotor blades of wind power installations are increasingly being produced in segments, wherein several rotor segments are connected together. Such a segmenting is absolutely necessary not least for transport reasons.

Because of the segmenting of the rotor blades, high static and dynamic forces act in particular on the connecting points. The ever larger designs mean that the static and dynamic forces are higher compared with smaller installations. Thus the requirements for the connecting points also rise with the increasing size of the rotor blades.

In addition, usually high safety factors are taken into account for these connecting points, in order to exclude breakage of a rotor blade as far as possible. Breakage of a rotor blade leads firstly to damage to the wind power installation itself, but in addition may cause substantial further damage to the environment of the wind power installation.

Normally mounting elements are used in such connection points. These mounting elements may be provided as additional elements in the form of bolts which are screwed or laminated into the rotor blade segment and can be brought into engagement with corresponding receivers on an adjacent rotor blade segment. So as to be able to absorb the loads occurring, such mounting elements must be dimensioned accordingly and thus lead to a considerable additional weight of the rotor blade.

The German Patent and Trade Mark Office has researched the following prior art in the priority application for the present application: U.S. Pat. No. 8,348,622 B2, US 2008/0069699 A1, US 2016/0341177 A1, US 2017/0089324 A1, US 2018/0298879 A1, WO 2003/078833 A1.

BRIEF SUMMARY

Provided is a rotor blade for a wind power installation, a rotor blade segment for such a rotor blade, a wind power installation, and a method for manufacturing such a rotor blade segment. In particular, provided are one or more techniques which allow for simple and secure connection of rotor blade segments.

According to a first aspect, provided a rotor blade for a wind power installation with a longitudinal direction (L) in which the rotor blade extends, at least one first rotor blade segment with a first end face, and at least one second rotor blade segment with a second end face, wherein the first rotor blade segment is coupled on the end face in the longitudinal direction to the second rotor blade segment, wherein the first and second rotor blade segments each comprise: a blade laminate with a plurality of laminate layers which are arranged stacked in a profile thickness direction (D) and, arranged on the end face, a plurality of mounting elements for coupling the first rotor blade segment to the second rotor blade segment, wherein each of the mounting elements extends in the longitudinal direction and has two contact faces which are arranged transversely, in particular orthogonally to the longitudinal direction (L) at a distance from one another which diminishes in non-linear fashion towards the end.

Because of such a non-linear reduction in the spacing of the contact faces, stress peaks at the tip of the mounting element can be reduced. Thus the stresses in the loaded region at the tip can be reduced by a comparatively slight, in particular gentle reduction in the spacing of the contact faces from one another. In the less heavily loaded, middle flank region of the mounting element, the reduction in the spacing may for example increase more steeply since in this region the loads on the connection are comparatively low. Thus the mounting elements provide a simple and secure connection of adjacent rotor blade segments.

The invention is based inter alia on the knowledge that with the design described here, the disadvantages of dovetail joints, which are known from remote technical fields such as for example woodworking, can be overcome, which would otherwise counter an application for rotor blades of large wind power installations.

The invention is based inter alia on the knowledge that in existing dovetail joints which provide for an application in rotor blades, such as U.S. Pat. No. 8,348,622 B2 and US 2016341177 A1, in particular stress peaks at the tip of each dovetail, which are concentrated at this point because of the stiffness jump, are disadvantageous. The stress peaks lead to a massive load on the connection and in particular the adhesion point, amplify the adhesive stresses and lead to a notch effect in the adjacent region of the blade laminate. The stress peaks at the tip of the dovetail may lead to detachment of the adhesive and consequently failure of the connection. The present invention reduces these disadvantages.

In the present case, the phrase "the spacing of the contact faces in the respective mounting elements diminishes in non-linear fashion" means in particular that in the longitudinal direction, the mounting element tapers starting from the blade laminate. The taper of the mounting element is non-linear.

Such a rotor blade preferably has a root region and a blade tip, wherein the rotor blade extends in the longitudinal direction (L) between the root region and the blade tip.

Furthermore, such a rotor blade preferably has a leading edge running substantially in the longitudinal direction, and a trailing edge spaced therefrom in a profile depth direction (Q) of the rotor blade and running in the longitudinal direction. In the present case, the profile thickness direction (D) in particular does not mean a global direction of the rotor blade, but a local direction in the region of a respective one of the mounting elements or several adjacent mounting elements, in each case preferably the normal of the plane formed by the laminate layers. For example, with a cylindrical rotor blade segment, the profile depth direction (D) thus corresponds to a radial of the rotor blade segment.

Preferably, the plurality of mounting elements are arranged adjacent to one another in a plane (E) orthogonal to the longitudinal direction (L), and between each two adjacent mounting elements, a free space is formed in which a corresponding mounting element is received such that the contact faces of the received mounting element are each in contact with one of the contact faces of the two adjacent mounting elements. Such an arrangement of the mounting elements allows the plurality of mounting elements to transmit forces in particular over a large area between the rotor blade segments. Thus, the mounting elements are arranged adjacent to and spaced apart from one another in the profile depth direction (Q), and also that the mounting elements are arranged adjacent to and spaced apart from one another in the profile thickness direction (D).

In the present case, the plane (E) is defined by the profile depth direction (Q) and the profile thickness direction (D), wherein the longitudinal direction (L) is the surface normal of the plane (E).

Further preferably, the contact faces of the received mounting element are each connected to one of the contacting contact faces of the two adjacent mounting elements by substance bonding, in particular by means of an adhesive which is applied to the contact faces of the two adjacent mounting elements and/or the contact faces of the received mounting element. A substance-bonded connection by means of the contact faces provides a large area joint which is hence appropriate for the material or fiber composite. In particular, joining by means of adhesive is advantageous since it can compensate for deviations in form and position caused by production and materials.

According to a preferred variant, the first and the second rotor blade segments each furthermore comprise: at least one reinforcing structure for receiving longitudinal forces which extend in the longitudinal direction (L) along the rotor blade segment, wherein the mounting elements are each arranged on the end face in the region of the respective reinforcing structure and couple the reinforcing structure of the first rotor blade segment to the reinforcing structure of the second rotor blade segment. Such reinforcing structures usually absorb a majority of the forces acting in the longitudinal direction. The coupling of the reinforcing structures by means of the mounting elements ensures that the force transmission between adjacent rotor blade segments is ensured by the reinforcing structures.

Further preferably, the reinforcing structure comprises at least one laminate layer, preferably a plurality of laminate layers, of a unidirectional lay, which are each oriented in the longitudinal direction (L), and wherein the plurality of mounting elements are molded integrally on the reinforcing structure. In a fiber composite material made of such a unidirectional lay, substantially all fibers are oriented in one direction, wherein fibers run in different directions purely for fixing. A fiber composite material with such a unidirectional lay constitutes an optimum use of the fiber properties with respect to stiffness and strength. Because of the anisotropic, in particular orthotropic properties of the fibers, normal forces from bending moments acting on the rotor blade can be optimally absorbed and transmitted by means of the mounting elements.

According to a preferred embodiment, the mounting elements have a laminate-side portion and an end-side portion, and the course of the contact faces in the laminate-side portion and/or the end-side portion relative to the longitudinal direction (L) is defined by a tangential peripheral condition. Thus the adhesive stresses in the laminate-side portion and/or end-side portion are reduced. Furthermore, the contact faces of the mounting elements draw asymptotically closer to the fiber orientation of the blade laminate or reinforcing structure, so as to give an optimized force introduction and transmission. Such a design of the mounting elements is particularly advantageous in cases in which the contact faces of the mounting elements are glued together. The adhesive stresses are reduced in particular by the force transfer suitable for the material and production.

According to a preferred refinement, the mounting elements have a laminate-side portion and an end-side portion, or the above-described laminate-side portion and end-side portion, wherein the spacing of the contact faces is constant at least in portions. A mutual spacing of the contact faces which is constant at least in portions reduces the adhesive stress in this region, and locally relieves the load on the coupling of the respective mounting elements of the first rotor blade segment and the mounting elements of the second rotor blade segment in this region. A contact face running parallel to the fiber orientation in addition allows optimized force transmission.

The laminate-side portion has at least a partial portion with constant spacing of the contact faces, and a further partial portion in which the spacing of the contact faces is defined by a tangential starting condition. Thus for example it is possible that a free space is formed between the contact faces of the two adjacent mounting elements which run in portions parallel to one another, and a mounting element with an end-side portion defined by a tangential peripheral condition can be introduced into this free space. Thus a tolerance region is provided between the parallel contact faces so that deviations in form and position, caused by production and temperature, of the mounting element introduced into the free space can be compensated.

According to a preferred refinement, the contact faces are spaced apart from one another in the profile thickness direction (D), wherein each of the contact faces on the end side draws asymptotically closer to a laminate layer of the blade laminate or a plane extending parallel to the laminate layers. Because of such an asymptotic course in the profile thickness direction (D), the respective contact face of the mounting element closely follows the fiber orientation of the blade laminate or the reinforcing structure. Accordingly, this guarantees a force transfer into the blade laminate or reinforcing structure which is appropriate for the material and production, and reduces the adhesive stress, in particular in the end-side portion, such that a stress peak at the tip of the mounting element is prevented.

According to a preferred refinement, the contact faces are spaced apart from one another in the profile thickness direction (D), wherein the spacing is constant at least in portions and the contact faces run in portions parallel to the laminate layers of the blade laminate and/or the reinforcing structure. Such a laminate-side or end-side portion of the mounting elements in which the spacing of the contact faces is constant offers the above-mentioned advantages, in particular a force transfer appropriate for production and material, and at the same time is simple to produce.

Preferably, the laminate-side portion has a longitudinal extent $L_1$ and the end-side portion has a longitudinal extent $L_2$, wherein the longitudinal extent $L_1$ is greater than the longitudinal extent $L_2$, and a tolerance region is formed adjacent to the laminate-side portion.

Further preferably, the tolerance region has a longitudinal extent which is defined by the difference $L_1-L_2$, and a width b, wherein the difference $L_1-L_2 \geq 3b$. Thus in the free space formed between two adjacent mounting elements, a tolerance region is provided in the longitudinal direction (L) so that production- and material-induced deviations in form and position in the longitudinal direction (L) can be tolerated, and damage to the blade laminate of the adjacent blade laminate and mounting elements can be prevented.

Further preferably, the mounting element has a longitudinal extent $L_3$, wherein the ratio of the maximum spacing (h) of the contact faces to the longitudinal extent is $L_3 \geq 5h$. Thus a sufficiently large longitudinal extent of the mounting element is provided and hence a gentle reduction in the spacing of the contact faces is guaranteed in order to reduce or avoid stress peaks.

Preferably, the longitudinal extent $L_3$ is a first longitudinal extent $L_{3.1}$ of at least one first mounting element, and the first and second rotor blade segments each furthermore comprise at least one second mounting element with a second longitudinal extent $L_{3.2}$ which is greater than the first longitudinal extent $L_{3.1}$. Thus the mounting elements have a longitudinal extent $L_{3.1}$ preferably in a first region, in particular in the region of the first reinforcing structure, and a second longitudinal extent $L_{3.2}$ in the region of the second reinforcing structure, wherein the first longitudinal extent $L_{3.1}$ is greater than the second longitudinal extent $L_{3.2}$. Thus the forces are introduced by the mounting elements offset to one another in the longitudinal direction so that stress peaks are avoided or reduced.

Preferably, the plurality of mounting elements are arranged spaced apart from or offset to one another in the longitudinal direction. Thus the force transfer points in the longitudinal direction are spaced apart from one another so that stress peaks are avoided or reduced.

Preferably, the minimum spacing (b) of the contact faces of the two adjacent mounting elements is ≥1 mm. Thus the mounting elements can still easily be produced with conventional production methods such as waterjet cutting. Furthermore, a spacing of 1 mm still allows a sufficient gap for example for the output of adhesive.

According to a preferred exemplary embodiment, the reinforcing structure comprises a spar and/or a leading edge reinforcement and/or a trailing edge reinforcement.

In a first aspect as described above, provided is a rotor blade. In a second aspect, provided is a rotor blade segment for such a rotor blade of a wind power installation. In a second aspect, provided is a rotor blade segment with an end face, wherein the rotor blade segment can be coupled on the end face in the longitudinal direction to an adjacent rotor blade segment, a blade laminate with a plurality of laminate layers which are stacked in a profile thickness direction (D), and arranged on the end face, a plurality of mounting elements which, for coupling the first rotor blade segment to the second rotor blade segment, can be brought into engagement with a plurality of corresponding mounting elements of the adjacent rotor blade segment, wherein each of the mounting elements extends in the longitudinal direction and has two contact faces which are arranged transversely to the longitudinal direction (L) at a distance from one another which diminishes in non-linear fashion towards the end. Preferred embodiments and advantages of the rotor blade according to the invention are also preferred embodiments and advantages of the rotor blade segment for such a rotor blade.

According to a third aspect, provided is a wind power installation with at least one rotor blade. The preferred embodiments and advantages of the rotor blade according to the invention are also preferred embodiments and advantages of a wind power installation with such a rotor blade.

According to a further aspect, provided is a method for manufacturing a rotor blade according to the first aspect of the invention for a wind power installation, comprising the steps: provision of a first rotor blade segment according to the second aspect, provision of at least one second rotor blade segment according to the second aspect, and bringing the plurality of mounting elements arranged on the end face of the first rotor blade segment into engagement with the corresponding mounting elements of the second rotor blade segment. By providing a first rotor blade segment and a second rotor blade segment, a method is indicated for manufacturing a segmented rotor blade which allows a secure and simple interconnection of the rotor blade segments.

The method according to the invention and its possible refinements have features or method steps which make them in particular suitable for use for a rotor blade or rotor blade segment according to the previous aspects and their respective refinements. For further advantages, embodiment variants and details of these further aspects and their possible refinements, reference is made to the previous description of the corresponding features and refinements of the rotor blade segment and rotor blade.

According to a preferred refinement, the plurality of mounting elements are arranged adjacent to one another in a plane (E) orthogonal to the longitudinal direction (L), wherein a free space is formed between each two adjacent mounting elements, and wherein the step of bringing into engagement furthermore comprises: receiving of a respective one of the corresponding mounting elements in each of the free spaces so that the contact faces of each received mounting element come into contact with a respective one of the contact faces of the two adjacent mounting elements. With such an arrangement of mounting elements, the plurality of mounting elements can introduce forces into the blade laminate or reinforcing structure of the respective rotor blade segment in particular over a large area and hence appropriately for the material. The forces are thus transmitted largely parallel to the fiber orientation of the laminate layers of the blade laminate or reinforcing structure. Because of the contacting contact faces of the two adjacent mounting elements of a first rotor blade segment and the corresponding mounting element of the second rotor blade segment, a compact connection of the first rotor blade segment and the second rotor blade segment is guaranteed. From the outside, the connection of the rotor blade segments is thus not visible, since in each case a mounting element of the second rotor blade segment is introduced completely into the free space. In the same way, also a mounting element of the first rotor blade segment is completely received into each respective space of a second rotor blade segment.

Further preferably, before the step of bringing into engagement, the method furthermore comprises: application of an adhesive to each of the contact faces of the first and/or second rotor blade segment. In particular, the gluing of the mounting elements to one another allows a secure connection or joint, suitable for the material, of the mounting elements and hence the rotor blade segments.

BRIEF DESCRIPTION OF THE SEVERAL VIEWS OF THE DRAWINGS

Preferred exemplary embodiments are explained as an example below with reference to the appended figures. The drawings show.

In the figures, the same elements or those with substantially the same or similar function are designated with the same reference signs.

DETAILED DESCRIPTION

Figure 1:
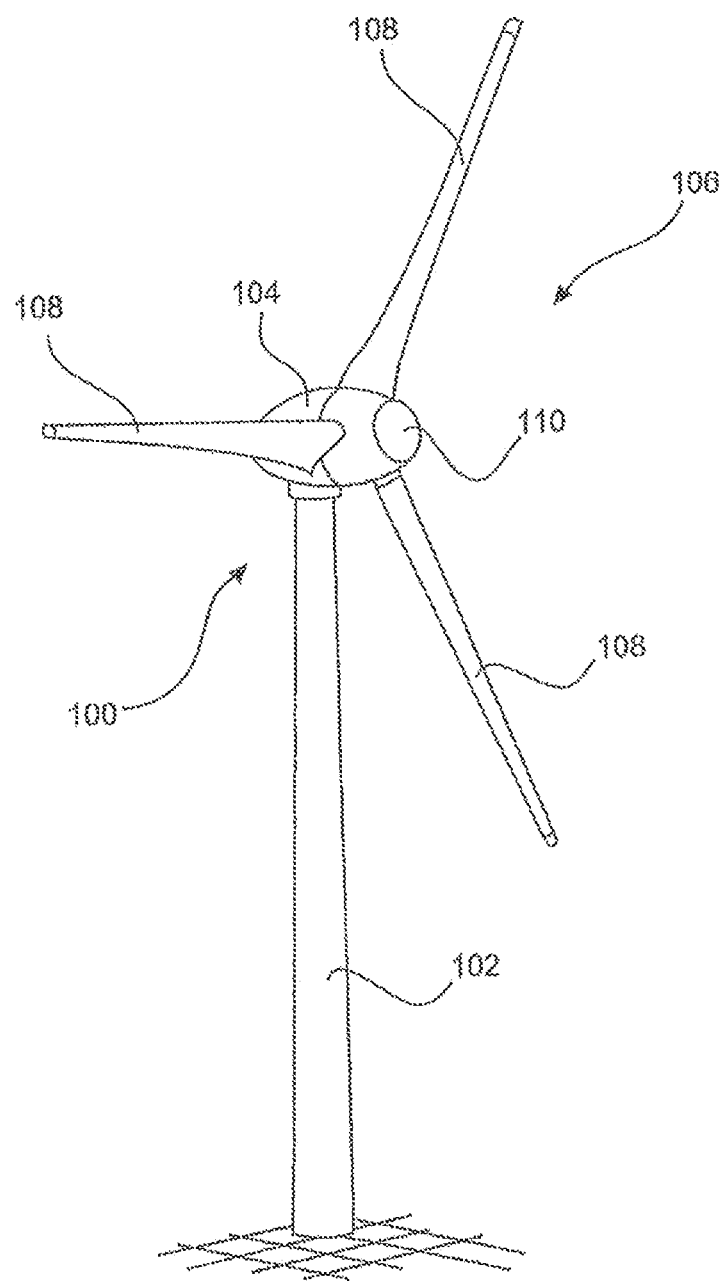
FIG. 1 shows a schematic, three-dimensional view of an exemplary embodiment of a wind power installation.

FIG. 1 shows a schematic, three-dimensional view of an exemplary embodiment of a wind power installation 100. FIG. 1 shows in particular a wind power installation 100 with a tower 102 and a nacelle 104. A rotor 106 with three rotor blades 108 and a spinner 110 is arranged on the nacelle 104. The rotor 106 is set in a rotational movement by the wind during operation and thereby drives a generator in the nacelle 104.

Figure 2:
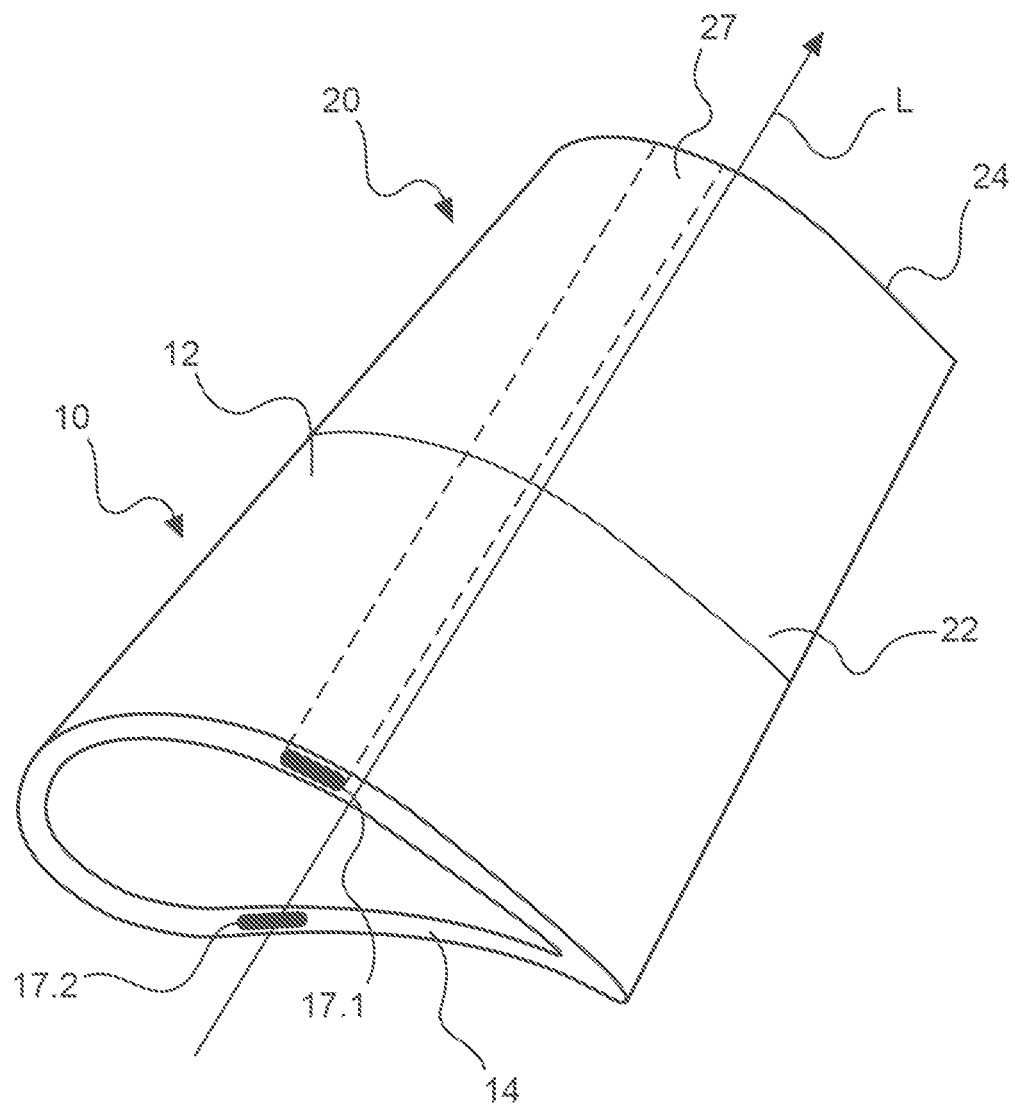
FIG. 2 shows a schematic, three-dimensional view of an extract of a rotor blade of the wind power installation from FIG. 1.

At least one of the rotor blades 108 of the rotor 106 may be configured as a two-piece or multipiece rotor blade with at least two rotor blade segments 10, 20 (see FIG. 2).

FIG. 2 shows a first rotor blade segment 10 with a first end face 12, and a second rotor blade segment 20 with a second end face 22. The first rotor blade segment 10 and the second rotor blade segment 20 are coupled together on the end faces in the longitudinal direction (L).

Figure 14:
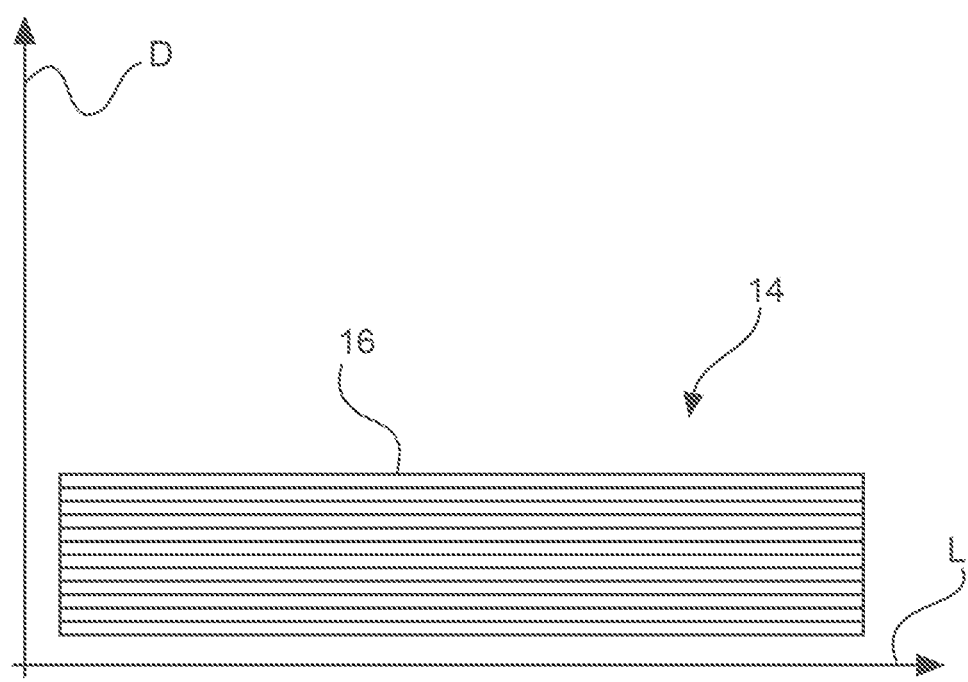
FIG. 14 shows a schematic, two-dimensional view of a plurality of laminate layers of a rotor blade segment from FIG. 3 or FIG. 4.

The first rotor blade segment 10 comprises a blade laminate 14 with a plurality of laminate layers 16 (see FIG. 14). The rotor blade 10 furthermore comprises a first reinforcing structure 17.1 which is arranged on the suction side 11.1 of the rotor blade segment 10, and a second reinforcing structure 17.2 which is arranged on the pressure side 11.2. The reinforcing structures 17.1, 17.2 extend in the longitudinal direction (L).

The second rotor blade segment 20 comprises a blade laminate 24 with a plurality of laminate layers (not shown) and a reinforcing structure 27 which extends in the longitudinal direction (L). The structure of the second rotor blade segment 20 furthermore corresponds to the structure of the first rotor blade segment 10.

Figure 3:
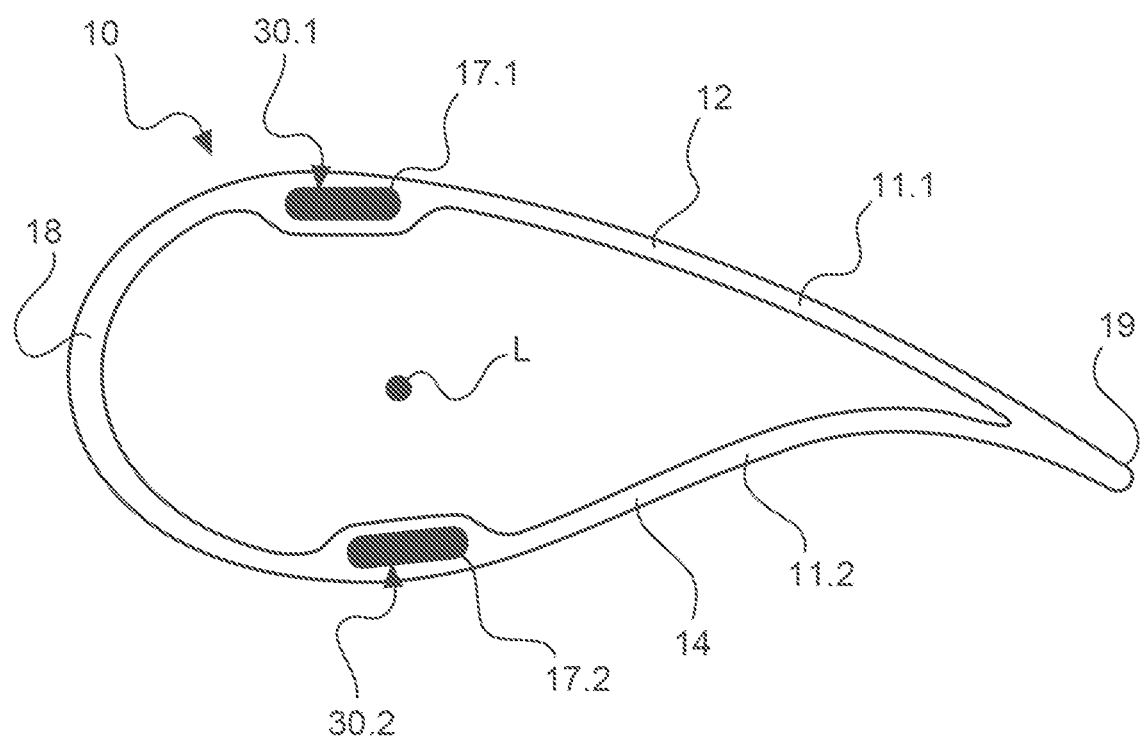
FIG. 3 shows a schematic, two-dimensional side view of a rotor blade segment of a rotor blade from FIG. 2.

FIG. 3 shows a side view of the end 12 of the end face of the first rotor blade segment 10.

The rotor blade segment 10 has a leading edge 18 and a trailing edge 19 which are arranged spaced apart from one another transversely to the longitudinal direction (L).

The reinforcing structure 17.1, 17.2 is here embedded in the blade laminate 14 and runs in the longitudinal direction (L). The reinforcing structure 17.1, 17.2 preferably comprises a unidirectional lay, the fibers of which are oriented in the longitudinal direction (L). A plurality of mounting elements 30.1, 30.2 are arranged on the end face 12, preferably in the region of the reinforcing structure 17.1, 17.2.

Figure 4:
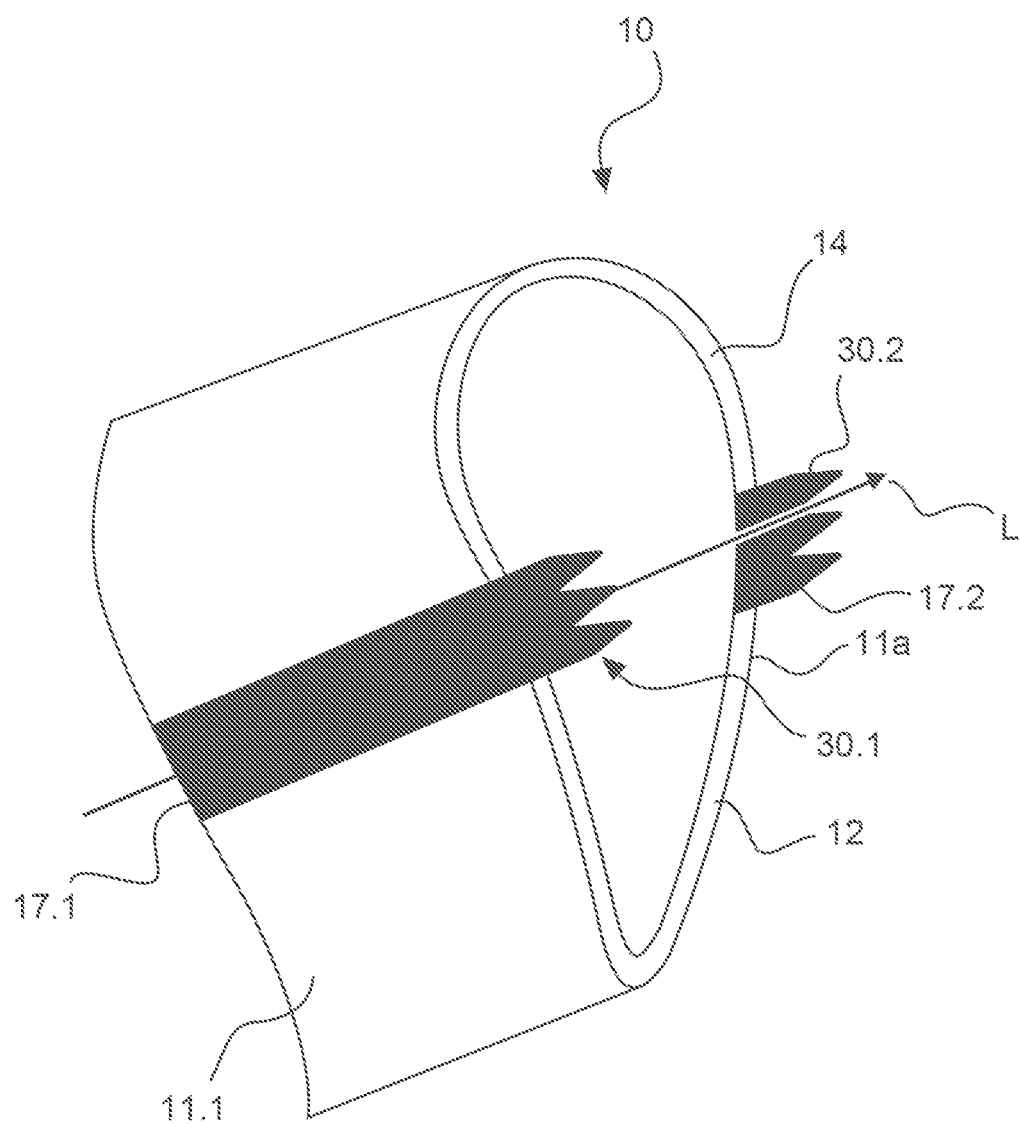
FIG. 4 shows a schematic, three-dimensional view of the rotor blade segment according to a first preferred exemplary embodiment.

As the three-dimensional view of the rotor blade segment 10 in FIG. 4 shows in particular, the plurality of mounting elements 30.1, 30.2 extend in the longitudinal direction (L). The mounting elements 30.1, 30.2 are here arranged on the end 12 of the end face in the region of the reinforcing structure 17.1, 17.2 of the rotor blade segment.

Figure 6:
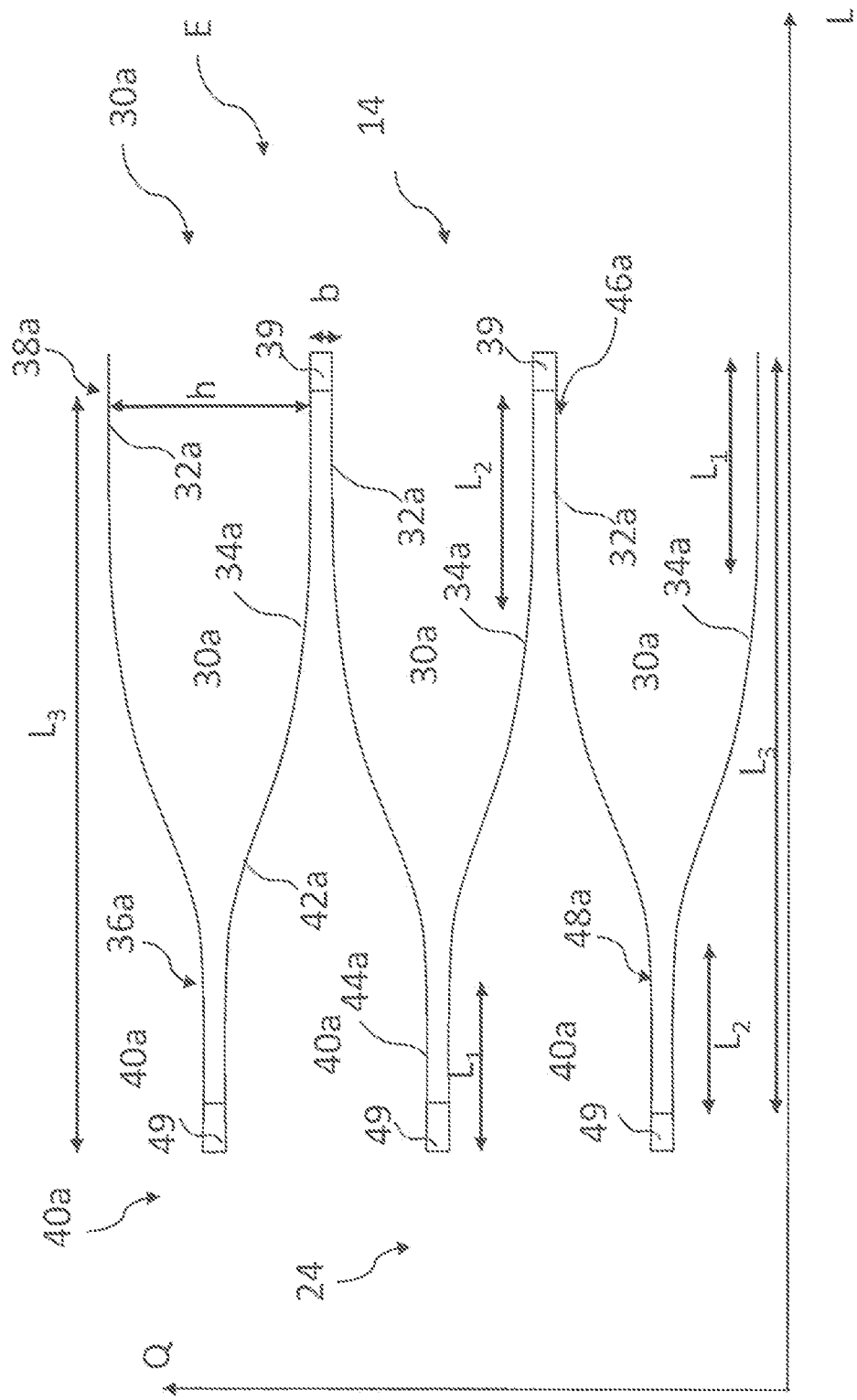
FIG. 6 shows a schematic, two-dimensional view of a plurality of mounting elements according to a first embodiment for a rotor blade segment from FIG. 4.
Figure 7:
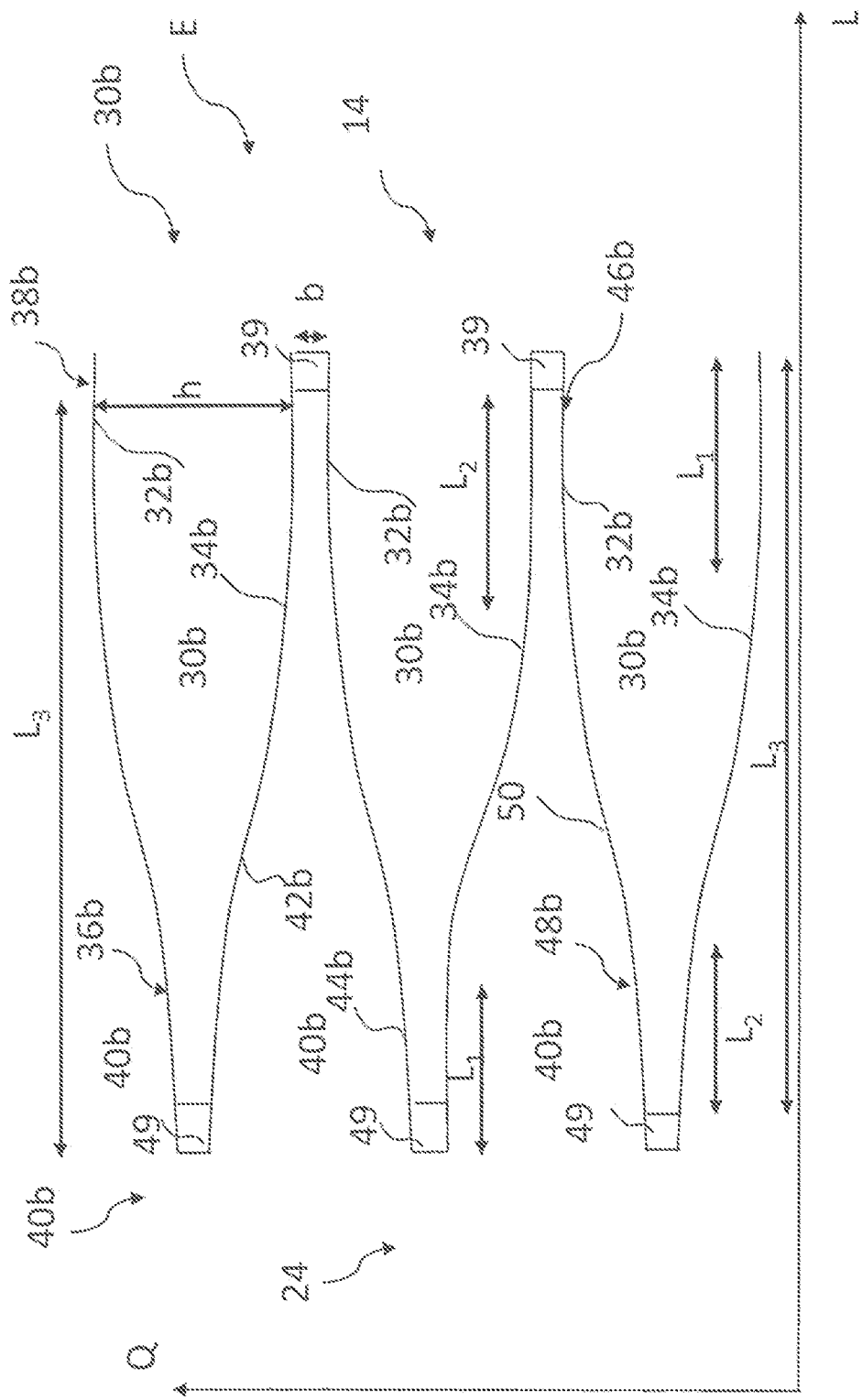
FIG. 7 shows a schematic, two-dimensional view of a plurality of mounting elements according to a second embodiment for a rotor blade segment from FIG. 4.

According to the preferred exemplary embodiment shown in FIG. 4, the mounting elements 30.1 are arranged on the first reinforcing structure 17.1, and the mounting elements 30.2 are arranged on the second reinforcing structure 17.2, spaced apart from one another in the profile depth direction (Q) (see FIGS. 6 and 7).

These mounting elements 30.1, 30.2 are designed to be coupled to corresponding mounting elements 40 (see FIGS. 6 to 9) of the second rotor blade segment 20 (see FIG. 2).

Figure 5:
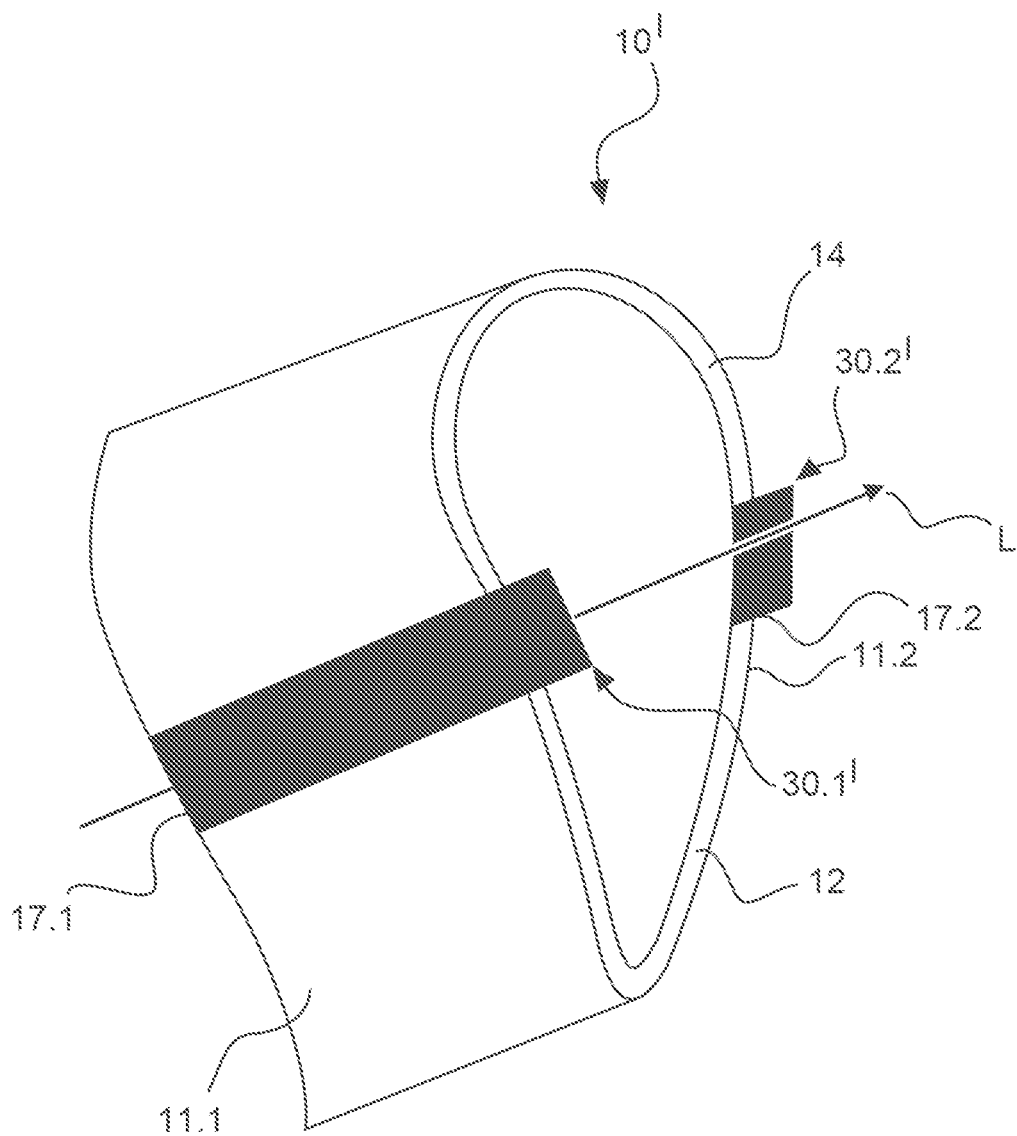
FIG. 5 shows a schematic, three-dimensional view of a rotor blade segment according to a second preferred exemplary embodiment.

The exemplary embodiment of the rotor blade segment 10' according to the invention, shown in FIG. 5, differs from the exemplary embodiment shown in FIG. 4 in that the mounting elements 30.1' and 30.2' are arranged adjacent to one another in the profile depth direction (D) (see FIGS. 10 to 13). The mounting elements 30.1' are arranged on the end face 12 in the region of the reinforcing structure 17.1 and extend in the longitudinal direction (L). The mounting elements 30.2' are arranged on the end face 12 in the region of the reinforcing structure 17.2 and extend in the longitudinal direction (L).

FIGS. 6 to 9 show exemplary embodiments of the mounting elements 30a, 30b, 30c, wherein mounting elements 30a, 30b, 30c are spaced apart from one another in a plane (E), in particular in the profile depth direction (Q).

As the detail illustration in FIG. 6 shows, the mounting elements 30a are configured such that between each two adjacent mounting elements 30a, a free space is formed in which a corresponding mounting element 40a of the second rotor blade segment 20 (see FIG. 2) is received.

According to the present schematic illustration, the mounting elements 40a each have a contact face 42a pointing upward and a contact face 44a pointing downward in the profile depth direction (Q).

Each of the mounting elements 40a is here received in the free space of the adjacent mounting elements 30a such that the contact faces 42a, 44a are each in contact with one of the contact faces 32a, 34a of the two adjacent mounting elements 30a.

An adhesive 50 is applied to the contact faces 32a, 34a of the mounting elements 30a and/or the contact faces 42a, 44a of the mounting elements 40a, which joins the mounting elements 30a of the first rotor blade segment 10 (see FIG. 1) to the mounting elements 40a of the second rotor blade segment 20 (see FIG. 2).

The mounting elements 30a, 40a are here formed, in particular integrally, on the end face of the blade laminate 14, 24 so that the fiber orientation of the layers of the blade laminate corresponds to the fiber orientation of the layers of the mounting elements 30a, 40a and vice versa. Alternatively, the mounting elements 30a, 40a could be formed integrally on the reinforcing structures 17.1, 17.2 (see FIGS. 4, 5).

The mounting elements 30a each have an end-side portion 36a in which the spacing of the contact faces 32a, 34a is constant.

The mounting elements 30a furthermore each have a laminate-side portion in which the spacing of the contact faces 32a, 34a is constant. Thus the contact faces 32a, 34a at least in portions run parallel to the fiber orientation of the blade laminate 14 (see FIG. 2) or the reinforcing structure 17 (see FIG. 4).

The spacing of the contact faces 42a, 44a in the profile depth direction (Q) of the mounting elements 40a runs according to the course of the contact faces 32a, 34a.

The minimum spacing of each two of the contact faces 32a, 34a and 42a, 44a is defined by the distance (b). The maximum spacing of each two of the contact faces 32a, 34a and 42a, 44a is defined by the distance (h).

The schematic detail view in FIG. 7 shows a further exemplary embodiment of the mounting elements 30b, 40b according to the invention.

The exemplary embodiment shown differs from the exemplary embodiment shown in FIG. 6 in that the respective spacing of the contact faces 32b, 34b in the profile depth direction (Q) of the mounting elements 30b diminishes towards the end such that each of the contact faces 32b, 42b in an end-side portion 36b draws asymptotically closer in the profile depth direction (Q) to a laminate layer 16 (see FIG. 14) of the blade laminate 14 (see FIG. 2) or to a plane extending parallel to the laminate layers. Furthermore, the spacing of the contact faces in the profile depth direction (Q) increases towards the laminate such that each of the contact faces 32b, 34b in the laminate-side portion 38b draws asymptotically closer in the profile depth direction (Q) to the fiber orientation of the blade laminate 14 or the reinforcing structure 17 (see FIG. 2).

The spacing of the contact faces 42b, 44b in the profile depth direction (Q) of the mounting elements 40a runs according to the course of the contact faces 32b, 34b.

As evident from FIGS. 6, 7, 8 and 9, the minimum spacing of each two of the contact faces 32a, 32b, 32c and 34a, 34b, 34c, and 42a, 42b, 42c and 44a, 44b, 44c is defined by the distance (b). The maximum spacing of each two of the contact faces 32a, 32b, 32c and 34a, 34b, 34c, and 42a, 42b, 42c and 44a, 44b, 44c is defined by the distance (h).

Figure 8:
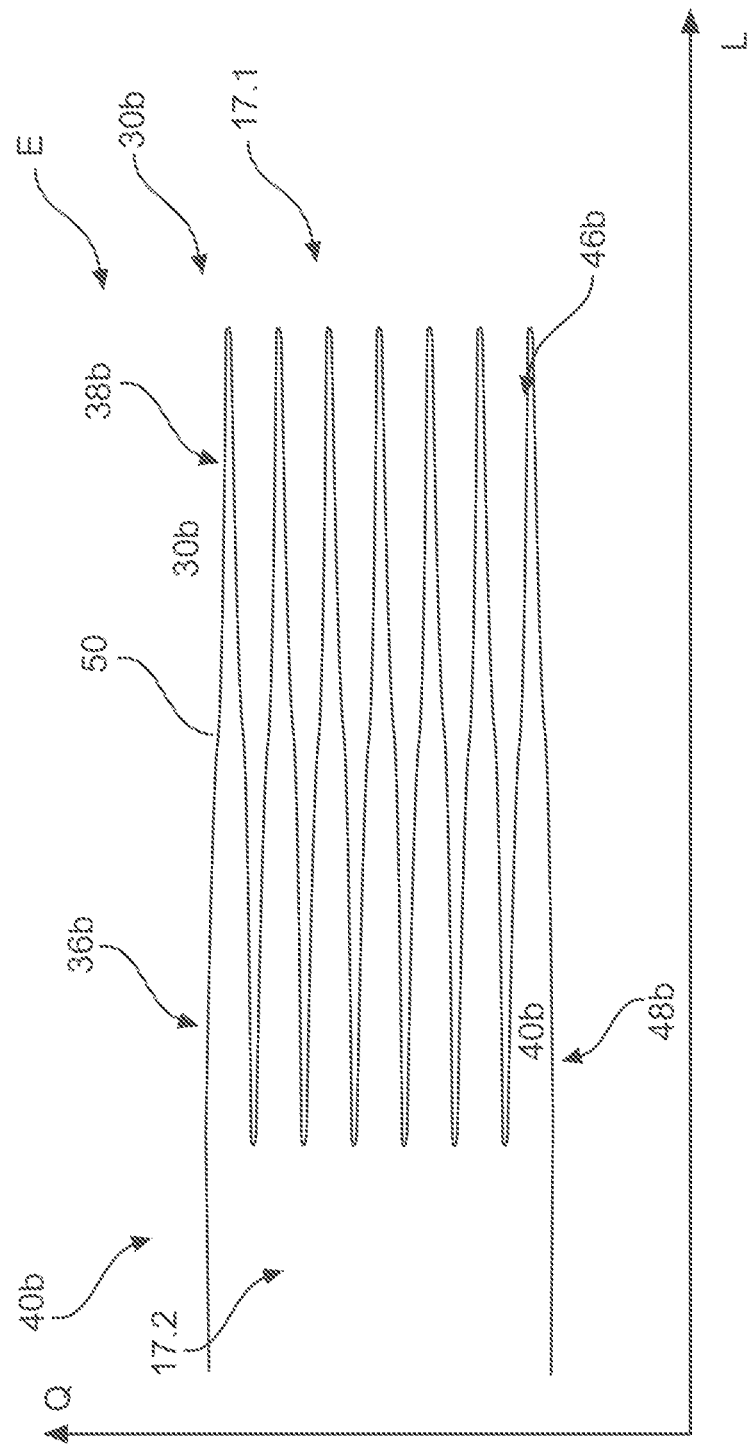
FIG. 8 shows a schematic, two-dimensional view of a plurality of mounting elements according to the first embodiment, which are arranged in a region of a reinforcing structure of the rotor blade segment from FIG. 4.

It is furthermore evident from FIGS. 6, 7 and 8, that the laminate-side portion 38a, 38b has a longitudinal extent $L_1$, and the end-side portion 36a, 36b has a longitudinal extent $L_2$, wherein the longitudinal extent $L_1$ is greater than the longitudinal extent $L_2$.

Furthermore, the laminate-side portion 48a, 48b has a longitudinal extent $L_1$ and the end-side portion 46a, 46b has a longitudinal extent La, wherein the longitudinal extent $L_1$ is greater than the longitudinal extent $L_2$.

Thus as evident in FIGS. 6 and 7, in each case a tolerance region 39, 49 is formed which can compensate for deviations in form and position caused by material and production.

According to the exemplary embodiment shown in FIG. 8, the mounting elements 30b, 40b are formed integrally on the reinforcing structure 17.1, 17.2, and the end-side portion 36a, 46a thus transforms gently into the laminate-side portion 38a, 48a such that the adhesive stresses of the adhesive 50 are reduced. The design of the exemplary embodiment otherwise corresponds to the exemplary embodiment shown in FIG. 7.

Figure 9:
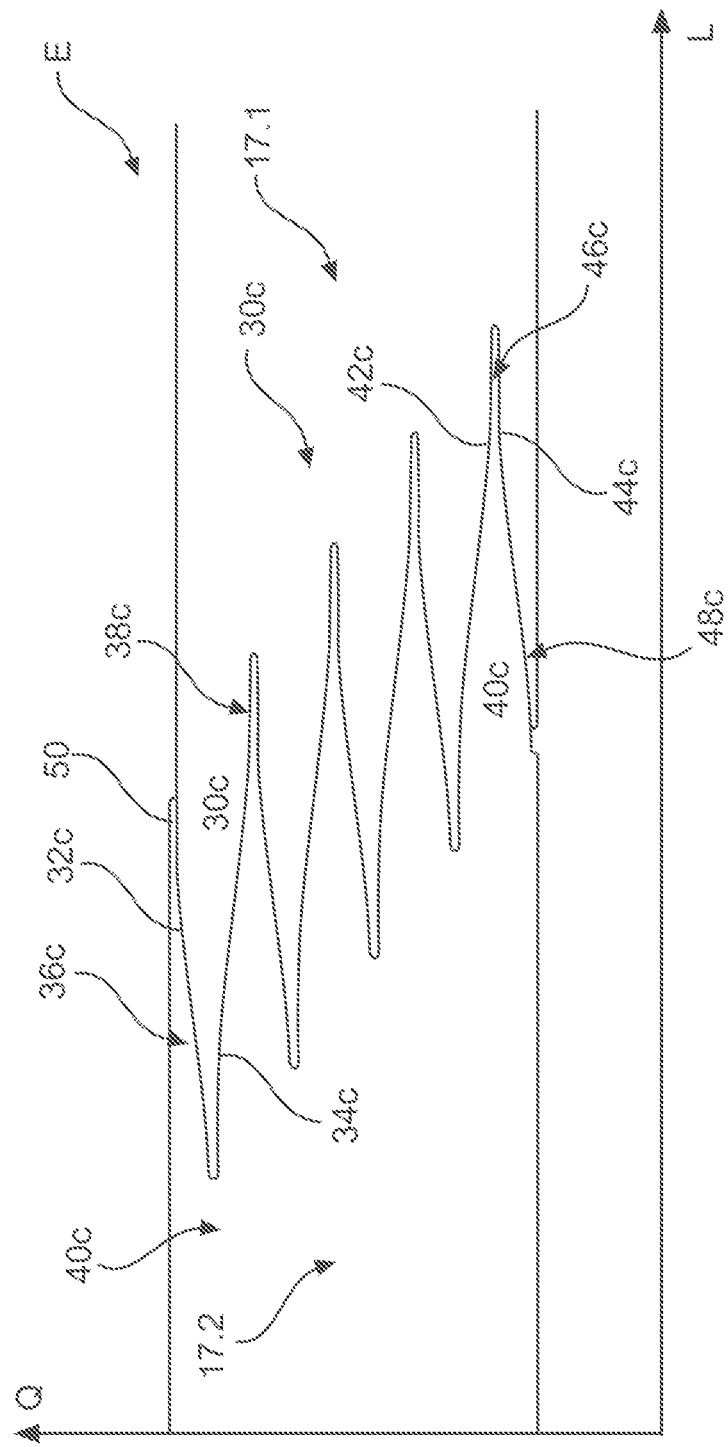
FIG. 9 shows a schematic, two-dimensional view of a plurality of mounting elements according to a third embodiment, which are arranged in a region of a reinforcing structure of the rotor blade segment from FIG. 4.

The exemplary embodiment of the mounting elements 30c, 40c shown in FIG. 9 differs from the exemplary embodiment shown in FIG. 8 in that the mounting elements 30, 40 are arranged both spaced apart from or adjacent to one another in the profile depth direction (Q) and offset to one another in the longitudinal direction (L). The mounting elements 30c here, in the illustration in FIG. 9, have a contact face 32c pointing upward in the profile depth direction (Q) and furthermore a second contact face 34c pointing downward in the profile depth direction (Q), wherein the upper contact face 32c is shorter than the lower contact face 34c.

Furthermore, the second mounting elements 40c according to the illustration in FIG. 9 also have a contact face 42c pointing upward in the profile depth direction (Q), and furthermore a second contact face 44c pointing downward in the profile depth direction (Q), wherein the upper contact face 42c is longer than the lower contact face 44c.

Due to the asymmetric design of the mounting elements 30c, 40c, these are arranged offset to one another in the longitudinal direction (L), so that stresses are distributed along the longitudinal direction (L) and stress peaks are avoided.

FIGS. 10 to 13 show exemplary embodiments of the mounting elements 30'a, 30'b, 30'c, wherein the mounting elements 30'a, 30'b, 30'c are spaced apart from one another in a plane (E), in particular in the profile thickness direction (D).

Figure 10:
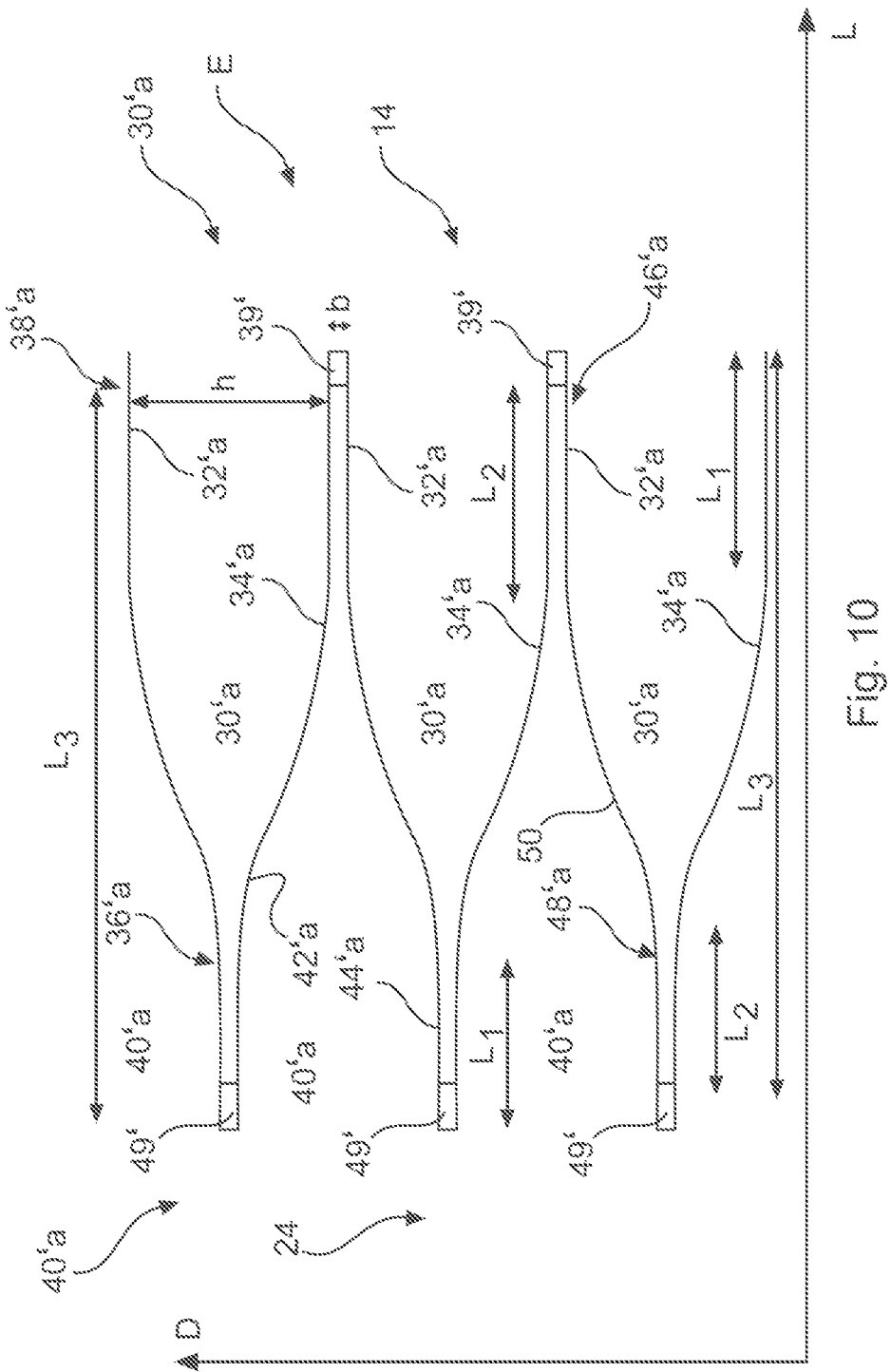
FIG. 10 shows a schematic, two-dimensional view of a plurality of mounting elements according to a first embodiment for a rotor blade segment from FIG. 5.

As the detail illustration in FIG. 10 shows, the mounting elements 30'a are configured such that between each two adjacent mounting elements 30'a, a free space is formed in which a corresponding mounting element 40'a of the second rotor blade segment 20 is received (see FIG. 2).

The mounting elements 40'a each have, in the present schematic illustration, a contact face 42'a pointing upward and a contact face 44'a pointing downward in the profile thickness direction (D).

Each of the mounting elements 40'a is here received in the free space of the adjacent mounting elements 30'a such that the contact faces 42'a, 44'a are in contact with a respective one of the contact faces 32'a, 34'a of the two adjacent mounting elements 30'a.

An adhesive 50 is applied to the contact faces 32'a, 34'a of the mounting elements 30'a and/or the contact faces 42'a, 44'a of the mounting elements 40'a, which joins the mounting elements 30'a of the first rotor blade segment 10 (see FIG. 1) to the mounting elements 40'a of the second rotor blade segment 20 (see FIG. 2).

The mounting elements 30'a, 40'a are here formed, in particular integrally, on the end face of the blade laminate 14, 24 so that the fiber orientation of the layers of the blade laminate corresponds to the fiber orientation of the layers of the mounting elements 30'a, 40'a and vice versa. Alternatively, the mounting elements 30'a, 40'a could be formed integrally with the reinforcing structures 17.1, 17.2 (see FIGS. 4, 5).

The mounting elements 30'a each have an end-side portion 36'a in which the spacing of the contact faces 32'a, 34'a is constant.

The mounting elements 30'a furthermore each have a laminate-side portion 38'a in which the spacing of the contact faces 32'a, 34'a is constant.

The spacing of the contact faces 42'a, 44'a in the profile thickness direction (D) of the mounting elements 40'a runs according to the course of the contact faces 32'a, 34'a.

Thus the contact faces 32'a, 34'a run at least in portions parallel to the laminate layers 16 (see FIG. 14) of the blade laminate 14 (see FIG. 2).

Figure 11:
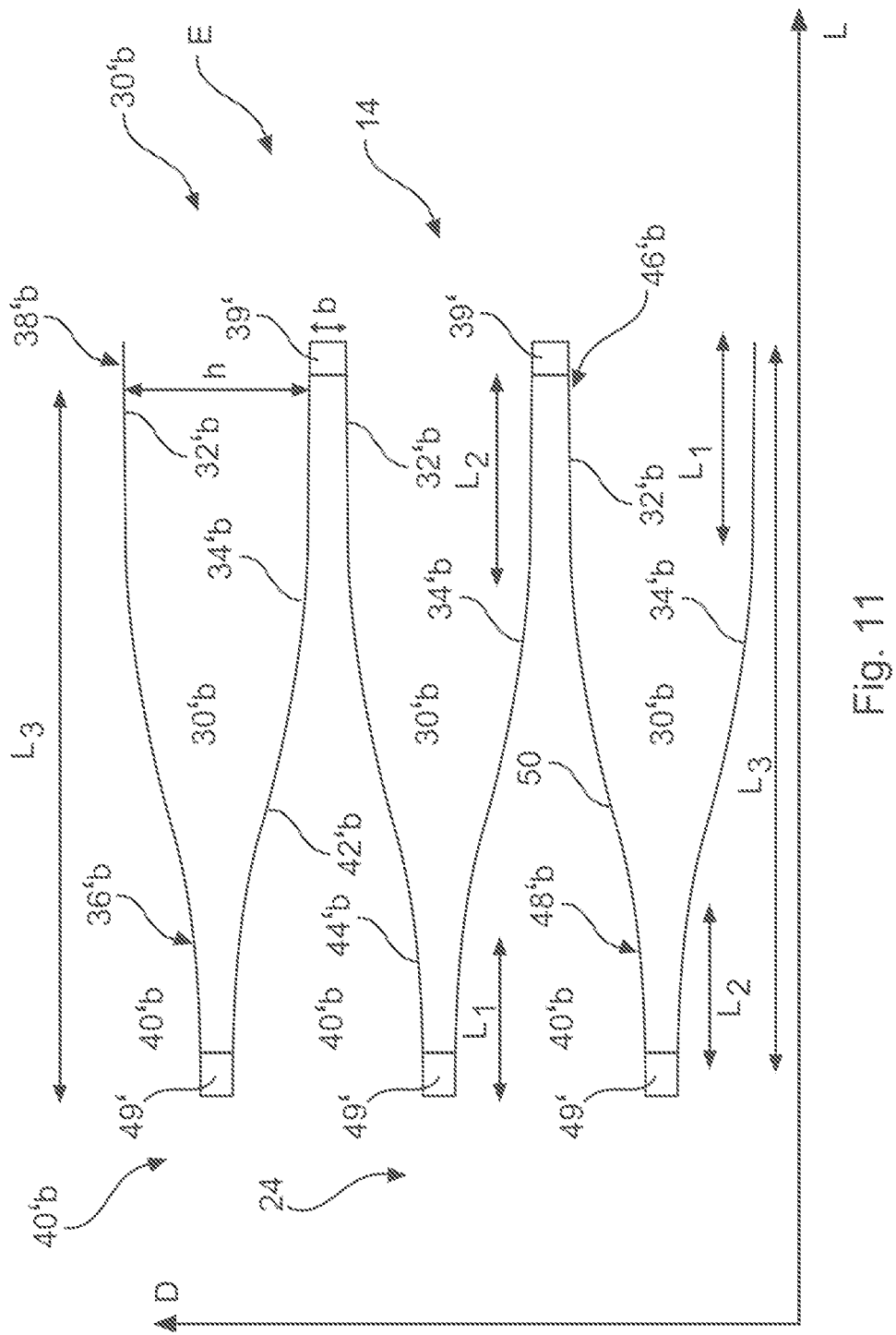
FIG. 11 shows a schematic, two-dimensional view of a plurality of mounting elements according to a second embodiment for a rotor blade segment from FIG. 5.
Figure 12:
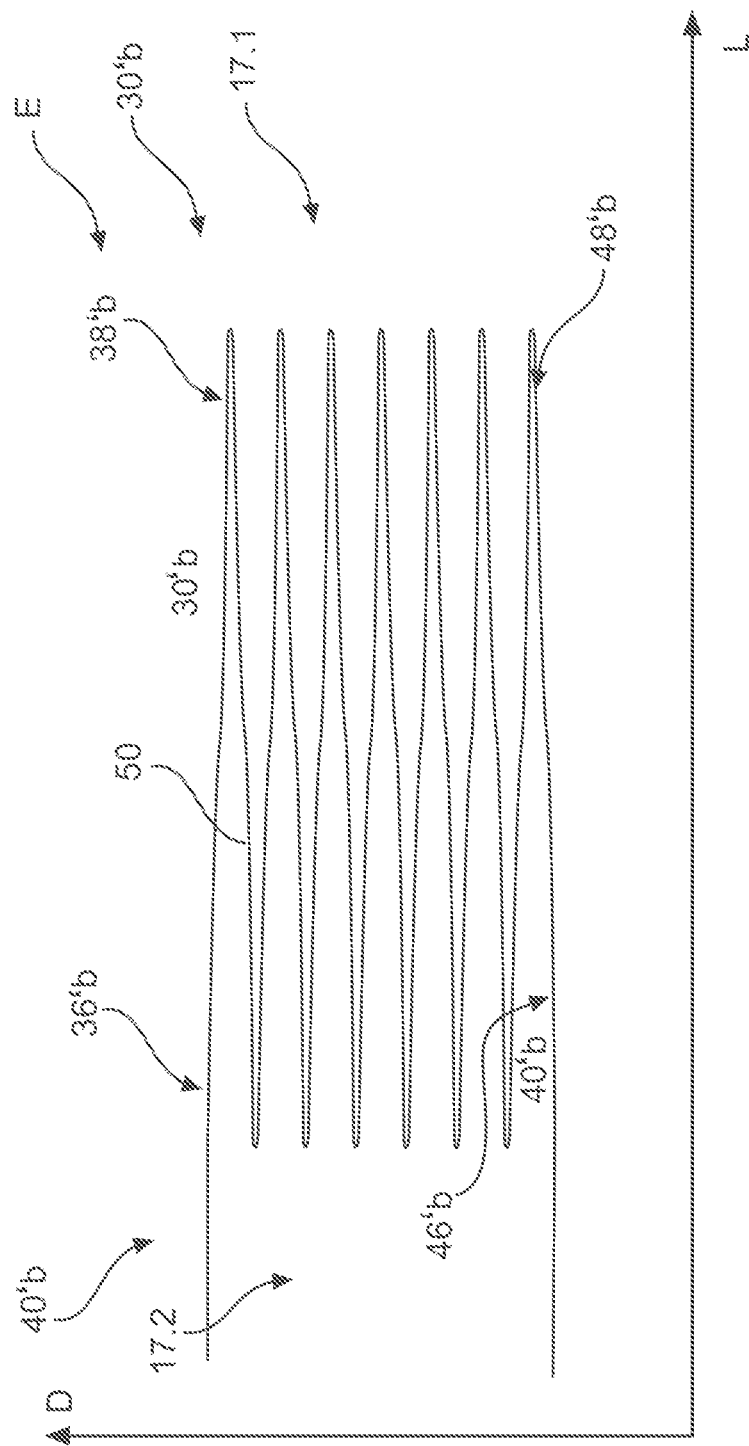
FIG. 12 shows a schematic, two-dimensional view of a plurality of mounting elements according to the first embodiment, which are arranged in a region of a reinforcing structure of the rotor blade segment from FIG. 5.

The schematic, detail view in FIGS. 11 and 12 shows a further exemplary embodiment of the mounting elements 30'b, 40'b according to the invention.

The exemplary embodiment shown differs from the exemplary embodiment shown in FIG. 10 in that the respective spacing of the contact faces 32'b, 34'b in the profile thickness direction (D) of the mounting elements 30'b diminishes towards the end such that each of the contact faces 32'b, 42'b in the end-side portion 36'b draws asymptotically closer in the profile thickness direction (D) to a laminate layer 16 (see FIG. 14) of the blade laminate 14 (see FIG. 2) or to a plane extending parallel to the laminate layers. Furthermore, the spacing of the contact faces in the profile thickness direction (D) increases towards the laminate side such that each of the contact faces 32'b, 34'b in the laminate-side portion 38'b draws asymptotically closer in the profile thickness direction (D) to a laminate layer 16 (see FIG. 14) of the blade laminate 14 (see FIG. 2) or to a plane extending parallel to the laminate layers.

The spacing of the contact faces 42'b, 44'b in the profile thickness direction (D) of the mounting elements 40'a runs according to the course of the contact faces 32'b, 34'b.

As evident from FIGS. 10, 11, 12 and 13, the minimum spacing of each two of the contact faces 32'a, 32'b, 32'c and 34'a, 34'b, 34'c, and 42'a, 42'b, 42'c and 44'a, 44'b, 44'c is defined by the distance (b). The maximum spacing of each two of the contact faces 32'a, 32'b, 32'c and 34'a, 34'b, 34'c, and 42'a, 42'b, 42'c and 44'a, 44'b, 44'c is defined by the distance (h).

It is furthermore evident from FIGS. 10, 11 and 12 that the laminate-side portion 38'a, 38'b has a longitudinal extent $L_1$, and the end-side portion 36'a, 36'b has a longitudinal extent $L_2$, wherein the longitudinal extent $L_1$ is greater than the longitudinal extent $L_2$.

Furthermore, the laminate-side portion 48'a, 48'b has a longitudinal extent $L_1$ and the end-side portion 46'a, 46'b has a longitudinal extent $L_2$, wherein the longitudinal extent $L_1$ is greater than the longitudinal extent $L_2$.

Thus as evident in FIGS. 10 and 11, in each case a tolerance region 39', 49' is formed which can compensate for deviations in form and position caused by material and production.

According to the exemplary embodiment shown in FIG. 12, the mounting elements 30'b, 40'b are formed integrally on the reinforcing structure 17.1, 17.2, and the end-side portion 36'a, 46'a thus transforms gently into the laminate-side portion 38'a, 48'a such that the adhesive stresses of the adhesive 50 are reduced. The design of the exemplary embodiment otherwise corresponds to that of the exemplary embodiment shown in FIG. 11.

Figure 13:
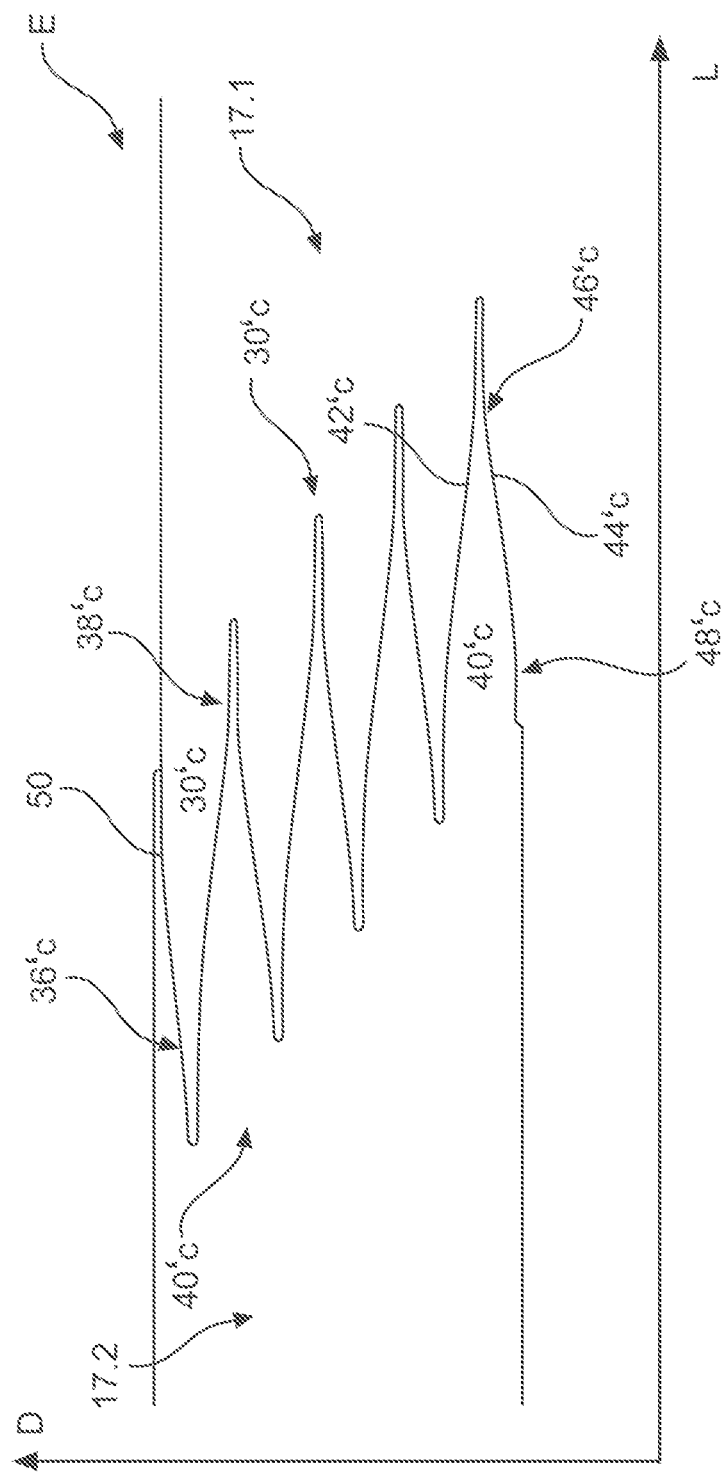
FIG. 13 shows a schematic, two-dimensional view of a plurality of mounting elements according to a third embodiment, which are arranged in a region of a reinforcing structure of the rotor blade segment from FIG. 5.

The exemplary embodiment of the mounting elements 30'c, 40'c shown in FIG. 13 differs from the exemplary embodiment shown in FIG. 12 in that the mounting elements 30'c, 40'c are arranged both spaced apart from or adjacent to one another in the profile thickness direction (D) and offset to one another in the longitudinal direction (L). The mounting elements 30'c here, in the illustration in FIG. 13, have a contact face 32'c pointing upward in the profile thickness direction (D) and furthermore a second contact face 34'c pointing downward in the profile thickness direction (D), wherein the upper contact face 32'c is shorter than the lower contact face 34'c.

Furthermore, the second mounting elements 40'c, according to the illustration in FIG. 13, also have a contact face 42'c pointing upward in the profile thickness direction (D), and furthermore a second contact face 44'c pointing downward in the profile thickness direction (D), wherein the upper contact face 42'c is longer than the lower contact face 44'c.

Due to the asymmetric design of the mounting elements 30'c, 40'c, these are arranged offset to one another in the longitudinal direction (L), so that stresses are distributed along the longitudinal direction (L) and stress peaks are avoided.

FIG. 14 shows an extract of the blade laminate 14 in a schematic view. According to this view, it is clear that the laminate layers 16 are stacked substantially parallel to one another in the profile thickness direction (D) and are arranged in a plane which runs substantially parallel to the longitudinal direction (L). The laminate layers 16 are preferably made of a fiber composite material, wherein undulations occur because of undulations for example in the weave-reinforced fiber composite materials.

In the context of the invention, a laminate layer means a layer which extends substantially parallel to the longitudinal direction (L), wherein undulations in the laminate layer from the weave structure lie within the bounds of the tolerance range.

Such a layer structure consisting of laminate layers stacked in the profile thickness direction (D) also exists in the region of the reinforcing structure 17 (see FIGS. 3 and 4), wherein the laminate layers are formed from a unidirectional lay, the fiber orientation of which runs in the longitudinal direction (L).

LIST OF REFERENCE SIGNS

100 Wind power installation
102 Tower
104 Nacelle
106 Rotor
108 Rotor blades
110 Spinner
10, 10' First rotor blade segment
11.1, 11.2 Pressure side, suction side
12 First end face
14 Blade laminate
16 Laminate layers
17, 17.1, 17.2 Reinforcing structure
18 Leading edge
19 Trailing edge 20 Second rotor blade segment
22 Second end face
24 Blade laminate
27 Reinforcing structure
30a, 30b, 30c, 30a', 30b', 30c',
30.1, 30.2 Mounting elements
32a, 32b, 32'a, 32'b First contact face
34a, 34b, 34'a, 34'b Second contact face
36a, 36b End-side portion
38a, 38b Laminate-side portion
39 Tolerance region
40a, 40b, 40c, 40, 40'a, 40'b, 40'c Mounting elements
42, 42a, 42b, 42c, 42, 42'a, 42'b, 42'c First contact face
44a, 34b, 44'a, 44'b Second contact face
46a, 46b End-side portion
48a, 48b Laminate-side portion
49 Tolerance region
L Longitudinal direction
$L_1$ Longitudinal extent
$L_2$ Longitudinal extent
$L_3$ Longitudinal extent
Q Profile depth direction
D Profile thickness direction
E Plane
b Minimum spacing
h Maximum spacing

The invention claimed is:

1. A rotor blade for a wind power installation comprising:
a rotor blade body having:
    a longitudinal direction, the rotor blade body extending in the longitudinal direction,
    a first rotor blade segment having a first end face, and
    a second rotor blade segment having a second end face, wherein the first rotor blade segment is coupled at the first end face to the second rotor blade segment,
wherein the first and second rotor blade segments each comprise:
    a blade laminate having a plurality of laminate layers that are arranged stacked in a profile thickness direction, and
    arranged on the first and second end face, respectively, a plurality of mounting elements for coupling the first rotor blade segment to the second rotor blade segment,
    wherein each of the plurality of mounting elements extends in the longitudinal direction and has two contact faces that are arranged transversely to the longitudinal direction at a distance from one another which diminishes in non-linear fashion towards an end.

2. The rotor blade as claimed in claim 1, wherein:
the plurality of mounting elements are arranged adjacent to one another in a plane orthogonal to the longitudinal direction, and
between each two adjacent mounting elements of the plurality of mounting elements, is a free space, wherein a corresponding mounting element is received in each free space such that the contact faces of the received corresponding mounting element are each in contact with one of the contact faces of the two adjacent mounting elements.

3. The rotor blade as claimed in claim 2, wherein the contacting contact faces of the received corresponding mounting element and the contact faces of the two adjacent mounting elements are bonded together by an adhesive.

4. The rotor blade as claimed in claim 1, wherein;
the first and the second rotor blade segments each comprise:
    at least one reinforcing structure for receiving longitudinal forces which extend in the longitudinal direction along the rotor blade segment,
    wherein the plurality of mounting elements are each arranged on the end face in the region of the respective reinforcing structure, and couple the reinforcing structure of the first rotor blade segment to the reinforcing structure of the second rotor blade segment.

5. The rotor blade as claimed in claim 4, wherein the reinforcing structure has a plurality of laminate layers extending in the longitudinal direction.

6. The rotor blade as claimed in claim 4, wherein the reinforcing structure comprises one or more of a spar, a leading edge reinforcement, or a trailing edge reinforcement.

7. The rotor blade as claimed in claim 1, wherein the plurality of mounting elements have a laminate-side portion and an end-side portion, and the spacing of the contact faces in the laminate-side portion and/or in the end-side portion is constant at least in portions.

8. The rotor blade as claimed in claim 1, wherein:
the plurality of mounting elements have a laminate-side portion and an end-side portion, and
the course of the contact faces in the laminate-side portion and/or the end-side portion relative to the longitudinal direction is defined by a tangential peripheral condition.

9. The rotor blade as claimed in claim 8, wherein:
the contact faces are spaced apart from one another in the profile thickness direction, and
each face end of the contact faces draw asymptotically closer to a laminate layer of the blade laminate or a plane extending parallel to the plurality of laminate layers.

10. The rotor blade as claimed in claim 9, wherein the plurality of mounting elements have a longitudinal extent, and a ratio of the maximum spacing of the contact faces to the longitudinal extent is at least 5.

11. The rotor blade as claimed in claim 10, wherein:
the longitudinal extent is a first longitudinal extent of at least one first mounting element, and
each of the first and second rotor blade segments comprise at least one second mounting element with a second longitudinal extent that is greater than the first longitudinal extent.

12. The rotor blade as claimed in claim 8, wherein:
the contact faces are spaced apart from one another in the profile thickness direction by a spacing, and
the spacing is constant at least in portions and the contact faces run in portions parallel to the plurality of laminate layers of the blade laminate and/or a blade laminate of the reinforcing structure.

13. The rotor blade as claimed in claim 8, wherein the laminate-side portion has a first longitudinal extent and the end-side portion has a second longitudinal extent, and the first longitudinal extent is greater than the second longitudinal extent, and wherein a tolerance region is formed adjacent to the laminate-side portion.

14. The rotor blade as claimed in claim 1, wherein the plurality of mounting elements are arranged spaced apart from or offset to one another in the longitudinal direction.

15. The rotor blade as claimed in claim 1, wherein a minimum spacing of the contact faces of two adjacent mounting elements is at least 1.5 millimeters.

16. A wind power installation comprising a tower, a rotor, and at least one rotor blade as claimed in claim 1.

17. A first rotor blade segment for a rotor blade of a wind power installation, comprising:
- an end face,
  - wherein the rotor blade segment is configured to be coupled on the end face in a longitudinal direction to an adjacent rotor blade segment,
- a blade laminate comprising a plurality of laminate layers, wherein the plurality of laminate layers are stacked in a profile thickness direction, and
- arranged on the end face, is a plurality of mounting elements configured to couple the first rotor blade segment to a second rotor blade segment when brought into engagement with a plurality of corresponding mounting elements of the adjacent rotor blade segment,
- wherein each of the plurality of mounting elements extends in the longitudinal direction and has two contact faces arranged orthogonal to the longitudinal direction and at a distance from one another which diminishes in nonlinear fashion towards an end.

18. A method of manufacturing a rotor blade of a wind power installation, the method comprising:
- bringing the plurality of mounting elements arranged on the end face of the first rotor blade segment as claimed in claim 16 into engagement with the plurality of corresponding mounting elements of the second rotor blade segment.

19. The method as claimed in claim 18, wherein:
the plurality of mounting elements and the plurality of corresponding mounting elements are arranged adjacent to one another in a plane orthogonal to the longitudinal direction, and a free space is formed between each two adjacent mounting elements of the plurality of mounting elements, and
the bringing comprises:
- receiving of a respective one of the corresponding mounting elements in each of the free spaces so that the contact faces of each received mounting element are in contact with a respective one of the contact faces of the two adjacent mounting elements.

20. The method as claimed in claim 19,
wherein before the bringing, the method comprises:
- applying an adhesive to each of the contact faces of the first and/or second rotor blade segment.

* * * * *